3,514,266
SEPARATION OF ALUMINUM, CALCIUM, AND MAGNESIUM FROM THE ALKALI METALS BY SOLVENT EXTRACTION

Ivan L. Nichols and Karl C. Dean, Salt Lake City, Utah, assignors to the United States of America as represented by the Secretary of the Interior
No Drawing. Filed Oct. 27, 1966, Ser. No. 590,101
Int. Cl. B01d 11/04; C01f 1/00
U.S. Cl. 23—312                               8 Claims

ABSTRACT OF THE DISCLOSURE

A method for separating aluminum, calcium and magnesium from alkali metals is disclosed. The separation is effected by extraction with an alkylphosphoric acid which has been pre-washed with ammonium carbonate.

---

Separations of aluminum, calcium and magnesium are necessary to remove contaminants from pollucite ore leach liquors to improve the production of cesium, as well as in the recovery of magnesium from sea water, brines or bitterns.

Due to the great value of cesium and magnesium, a method which will easily and economically perform such a separation will be of particular value.

Previous methods aimed at effecting these separations have involved the use of precipitating agents. In the case of removing aluminum and calcium from pollucite leach liquors ammonium hydroxide is the conventional precipitating agent whereas magnesium is precipitated and recovered from brines by the use of lime or crushed oystershells. These separations are incomplete and are undesirably complex. A new improved method is needed to carry out these separations.

We have now found that aluminum, calcium and magnesium ions can be easily and efficiently separated from alkali metal ions by solvent extraction when the organic phase extractant is subject to prior use to a scrub with mmmonium carbonate.

Thus, the objects of this invention are:
To provide an improved process for the separation of aluminum, calcium and magnesium ions from alkali metal ions;
To provide an improved process of solvent extraction wherein aluminum, calcium and magnesium ions may be separated from alkali metal ions;
To provide a pretreatment for a solvent extraction process for separating aluminum, calcium and magnesium ions from alkali metal ions.

These and other objects and advantages of the present invention will become more apparent from the following description of the invention.

Briefly, the invention comprises a novel solvent extraction for separating aluminum, calcium and magnesium ions from alkali metal ions wherein prior to the extraction, the organic phase is scrubbed with ammonium carbonate.

We have found that if cationic organic extractants such as the alkylphosphoric acids are scrubbed with a 1.0 to 2.5 molar ammonium carbonate wash, their selectivities to aluminum, calcium and magnesium are greatly enhanced.

Organophosphates have been employed commercially as cationic extractants. Methods of preparing these extractants are fully set out by Bridges et al.[1] many metals are extracted by the alkylphosphoric acids, the most prominent commercial applications being the extraction of uranium by di - (2 - ethylhexyl) phosphoric acid (EHPA), and thorium by monoheptadecyl phosphoric acid (HDPA). However, previous to this invention alkylphosphoric acids were not thought to be commercially applicable to the extraction of aluminum, calcium or magnesium ions from solutions containing alkali metals because of ther low selectivity for these ions.[2] Our process contemplates using alkylphosphoric acids to extract aluminum, calcium and magnesium ions from alkali metal ions by first scrubbing the acid extractants with a wash of 1.0–2.5 molar ammonium carbonate.

Following this preliminary wash, the organic phase and the metal laden aqueous phase are mixed and then allowed to settle and separate. The alkali metal ions remain with the aqueous or raffinate phase. The aluminum, calcium or magnesium laden organic phase can then be stripped by contacting therewith an appropriate acid, base or salt solution. For example, the strip solution can be an acid such as hydrochloric in which case the metal ions remain in solution, or it can be a base such as ammonium carbonate which will cause the metals to precipitate, but which does not have the advantage of leaving the alkylphosphoric acid in the ammonia form ready for further use.

The present extraction process may be carried out in a wide variety of conventional equipment, the particular form of apparatus not being critical. Any of the conventional equipment cited by Bridges et al.[3] may be used to advantage, although the preferred mode of carrying out the extraction is by way of a continuous countercurrent process, in which multi-stage or cascade systems are employed.

As previously mentioned, the class of solvents contemplated is the alkylphosphoric acids which includes, di-(2-ethylhexyl) phosphoric acid (EHPA), heptadecyl phosphoric acid (HDPA), mono-di-para (1,1,3,3-tetramethyl butyl) phenyl phosphoric acid, and octyl pyrophosphoric acid (GPA). Monodecyl phosphoric acid (DDPA), is not recommended because the sodium form is insoluble even after the addition of modifying agents. Modifying agents such as long chain alcohols or tributyl phosphate (TBP) may be added to the organic phase before contact with the metal laden aqueous phase to decrease alkali metal extraction and to prevent sodium precipitation. The use of these agents to prevent sodium precepitation when using sodium containing alkali stripping solutions with alkylphosphoric acids is well known.[4]

The rato of phases may be varied to produce the most advantageous separations for each particular process such adjustment being within the skill of the ordinary worker in the art.

To further illustrate the invention, the following examples are set forth. In each case, the extractant was a 0.5 molar solution of EHPA made by combining the commercially available reagent with kerosine. In practice, the concentration of the extractants solution could be varied over wide limits.

EXAMPLE 1

Extration of aluminum from pollucite hydrochloric acid leach liquor was accomplished by the following method. Test conditions included use of an organic extraction composed of 0.5 molar EHPA that had been washed with 1

---

[1] D. W. Bridges, J. B. Rosenbaum, Metallurgical Application of Solvent Extraction, Bureau of Mines Information Circular No. 8139 (1962).

[2] White, J. C., Extraction of Metal Ions With Di-(2-Ethylhexyl)Phosphoric Acid, Oak Ridge Nat. Lab. ORNL-CF-57-2-37, Feb. 8, 1957.

[3] Page 24 (citation 1 supra).

[4] Blake, C. A., Crouse, D. J., Coleman, C. F., Brown, K. B., and Kelmers, A. D., Further Studies of the Dialkylphosphoric Acid Extraction (Dapex) Process for Uranium, Oak Ridge Nat. Lab. ORNL-2172, Jan. 23, 1957.

molar ammonium carbonate solution and 10 percent tributyl phosphate (TBP) added to the EHPA; a phase ratio organic to aqueous of 3 to 1; a pH 5.0 dilute hydrochloric acid scrub of the loaded organic; and final stripping of the organic phase with 5 molar hydrochloric acid containing 10 percent hydrofluoric acid. The TBP acted to (1) decrease cesium extraction and (2) as a modifier to prevent precipitation of the sodium form of EHPA. Complete stripping of aluminum required the addition of hydrofluoric acid, as noted. Test results are shown in Table 1.

nate and pH 5.0 scrub could be removed by precipitation, if desired.

Again it was possible to use 2 molar ammonium carbonate to strip the calcium from EHPA, but as was true with aluminum, the calcium precipitates and would require a filtration step.

EXAMPLE 3

The general method was applied to separation of magnesium from a sea water sample. Analysis was limited to magnesium and sodium. Lithium was of interest, but was

TABLE 1.—EXTRACTION OF ALUMINUM FROM POLLUCITE HYDROCHLORIC ACID LEACH LIQUOR

| Product | Ml | pH | Analysis, g./l. | | | Distribution, pct. | | |
|---|---|---|---|---|---|---|---|---|
| | | | Rb | Cs | Al | Rb | Cs | Al |
| Raffinate | 30 | 4.8 | 0.12 | 7.60 | 0.0022 | 73.5 | 94.0 | 0.0 |
| pH 5.0 scrub | 50 | 4.2 | .01 | .27 | .0001 | 10.2 | 5.6 | .0 |
| Strip solution [5] | 50 | .0 | .01 | .01 | 1.7 | 10.2 | .3 | 99.9 |
| Stripped organic phase | 75 | | .005 | .005 | .0022 | 6.1 | .1 | .1 |
| Feed solution | | | .18 | 10.0 | 3.19 | 100.0 | 100.0 | 100.0 |
| Extraction into organic phase | | | | | | 26.5 | 6.0 | 100.0 |
| Strip solution plus organic phase | | | | | | 16.3 | .4 | 100.0 |
| Raffinate plus pH 5.0 scrub | | | | | | 83.7 | 99.6 | 0.0 |

[5] 5 M HCl plus 10 pct. HF.

It can be seen from Table 1 that an excellent separation of cesium and aluminum was achieved, particularly for a one-stage contact. Further, the pH 5.0 scrub was effective in recovering cesium initially extracted by the EHPA.

A similar test employing 2.0 molar ammonium carbonate as the strip solution showed that it was effective to the same degree as the acid strip, with essentially all of the aluminum being precipitated.

EXAMPLE 2

Extraction of calcium from pollucite chloridizing roast and water leach liquor was accomplished in a manner similar to Example 1. The roast and water leach liquor was produced by roasting minus 200-mesh pollucite ore with 2 parts of limestone and 0.5 part calcium chloride, by weight, for 1 hour at 900° C. The roast residue then was leached at 35 percent solids for 1 hour at 80° C. with water.

Variations in the solvent extraction method used in Example 1 included changing the organic-to-aqueous ratio to 1 to 2 and use of a 1-molar hydrochloric acid strip.

present in such low quantities that distributions were not determined. Presence of some sodium in the magnesium product was not considered disadvantageous, because some sodium chloride is necessary in the electrolysis of magnesium chloride. In the example cited in Table 3, the organic and aqueous phases were preheated to 30° C., a temperature considered attainable by solar heating. A phase ratio of unity was used.

TABLE 3.—EXTRACTION OF MAGNESIUM FROM SEA WATER

| Product | Ml | pH | Analysis, g./l. | | Distribution, pct. | |
|---|---|---|---|---|---|---|
| | | | Mg | Na | Mg | Na |
| Raffinate | 25 | 8.1 | 0.02 | 7.6 | 1.4 | 74.7 |
| 1 M HCl strip solution | 26 | | 1.36 | 2.4 | 98.0 | 24.5 |
| Organic phase | 25 | | .01 | .06 | .6 | .8 |
| Feed solution | | | 1.2 | 10.2 | 100.0 100.0 | 100.0 |

Table 3 shows a good separation of magnesium from sodium. By decreasing the organic to aqueous phase ratio to about 1 to 3, the concentration of magnesium can be greatly increased.

From the above examples it can be seen that aluminum, calcium and magnesium can be effectively separated from alkali metals by a solvent extraction with an alkylphosphoric acid when the extractant has been given a prewash with ammonium carbonate.

As will be apparent to those skilled in the art, the present invention is subject to a variety of adaptations and modifications and may be used to purify either aluminum, calcium and magnesium or the alkali metals.

What is claimed is:

1. A method of separating aluminum, calcium and

TABLE 2.—EXTRACTION OF CALCIUM FROM POLLUCITE CHLORIDIZING ROAST AND WATER LEACH LIQUOR

| Product | Ml | pH | Analysis, g./l. | | | Distribution, pct. | | |
|---|---|---|---|---|---|---|---|---|
| | | | Rb | Cs | Ca | Rb | Cs | A |
| Raffinate | 50 | 6.7 | 0.30 | 9.20 | 0.1 | 88.2 | 95.2 | 2.9 |
| pH 5.0 scrub | 25 | 6.2 | .06 | .88 | .14 | 8.8 | 4.6 | 2.0 |
| Strip solution [6] | 25 | .3 | .01 | .03 | 6.57 | 1.8 | .1 | 94.4 |
| Stripped organic phase | 25 | | .005 | .005 | .05 | 1.2 | .1 | .7 |
| Feed solution | | | .30 | 10.0 | 3.86 | 100.0 | 100.0 | 100.0 |
| Extraction into organic phase | | | | | | 11.8 | 4.8 | 97.1 |
| Strip solution plus organic phase | | | | | | 3.0 | .2 | 95.1 |
| Raffinate plus pH 5.0 scrub | | | | | | 97.0 | 99.8 | 4.9 |

[6] 1 M HCl.

Excellent separation of calcium from the alkalis was obtained, and although variations in test conditions failed to produce a method wherein no calcium reported in the pH 5.0 scrub, the small amount of calcium in the raffinate magnesium ions from alkali metal ions which comprises:
(a) washing an organic solution of an alkylphosphoric acid selected from the group consisting of di-(2-ethylhexyl) phosphoric acid, heptadecyl phosphoric acid, mono-di-para (1,1,3,3-tetramethyl butyl) phenyl phosphoric acid, and octyl phosphoric acid, with ammonium carbonate;

(b) mixing the washed acid from step (a) with an aqueous solution containing alkali ions together with at least one member of the class consisting of aluminum ions, calcium ions, and magnesium ions;

(c) allowing the mixture formed in step (b) to separate into an aqueous phase and an organic phase and (d) stripping the ions of said class from said organic phase using an aqueous acid solution.

2. The method of claim 1 wherein the solution containing alkali metal ions contains cesium ions and wherein said cesium ions are recovered from said aqueous phase.

3. The method of claim 1 wherein the aqueous solution contains aluminum ions.

4. The method of claim 1 wherein the aqueous solution contains magnesium ions.

5. The method of claim 1 wherein the aqueous solution contains calcium ions.

6. The method of claim 1 wherein the alkylphosphoric acid is di(2-ethylhexyl) phosphoric acid.

7. The method of claim 2 wherein the alkylphosphoric acid is di-(2-ethylhexyl) phosphoric acid.

8. The method of claim 4 wherein the alkylphosphoric acid is di-(2-ethylhexyl) phosphoric acid.

References Cited

UNITED STATES PATENTS

| | | | |
|---|---|---|---|
| 3,052,514 | 9/1962 | Schmitt | 23—312 X |
| 3,104,971 | 9/1963 | Olson | 23—312 X |
| 3,131,994 | 5/1964 | Surls | 23—312 X |
| 3,214,454 | 10/1965 | Blaser | 260—429.9 |
| 3,259,456 | 7/1966 | Maddox | 23—312 X |
| 3,302,993 | 2/1967 | Bray | 23—312 X |
| 3,343,912 | 9/1967 | Schulz | 23—312 X |

FOREIGN PATENTS

| | | |
|---|---|---|
| 246,105 | 7/1963 | Australia. |
| 994,702 | 6/1965 | Great Britain. |
| 1,025,866 | 4/1966 | Great Britain. |

NORMAN YUDKOFF Primary Examiner

S. J. EMERY, Assistant Examiner

U.S. Cl. X.R.

23—90, 91, 96